US008355530B2

(12) United States Patent
Park et al.

(10) Patent No.: US 8,355,530 B2
(45) Date of Patent: Jan. 15, 2013

(54) LIVENESS DETECTION METHOD AND APPARATUS OF VIDEO IMAGE

(75) Inventors: Gyu-tae Park, Anyang-si (KR); Haitao Wang, Beijing (CN); Young-su Moon, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1048 days.

(21) Appl. No.: 11/889,413

(22) Filed: Aug. 13, 2007

(65) Prior Publication Data

US 2008/0192980 A1 Aug. 14, 2008

(30) Foreign Application Priority Data

Feb. 14, 2007 (KR) .................. 10-2007-0015530

(51) Int. Cl.
*G06K 9/00* (2006.01)
(52) U.S. Cl. ........ 382/103; 382/107; 382/115; 382/116; 382/117; 382/118; 382/154; 382/190
(58) Field of Classification Search .................. 382/103, 382/107, 115, 117, 118, 154, 190
See application file for complete search history.

(56) References Cited

U.S. PATENT DOCUMENTS

| 5,802,220 | A  | * | 9/1998  | Black et al. ................... 382/276 |
| 5,987,153 | A  | * | 11/1999 | Chan et al. ..................... 382/115 |
| 7,327,860 | B2 | * | 2/2008  | Derakhshani et al. ........ 382/117 |
| 7,508,960 | B1 | * | 3/2009  | Bolle et al. .................... 382/117 |
| 2002/0183624 | A1 |   | 12/2002 | Rowe et al. ................... 600/476 |
| 2003/0113031 | A1 | * | 6/2003  | Wal ............................... 382/260 |
| 2004/0037450 | A1 | * | 2/2004  | Bradski ......................... 382/103 |
| 2005/0074148 | A1 | * | 4/2005  | Rodyushkin et al. ......... 382/118 |
| 2005/0094849 | A1 | * | 5/2005  | Sung et al. .................... 382/103 |
| 2005/0129286 | A1 |   | 6/2005  | Hekimian ..................... 382/117 |
| 2005/0134427 | A1 |   | 6/2005  | Hekimian .................... 340/5.53 |
| 2006/0093183 | A1 | * | 5/2006  | Hosoi ........................... 382/103 |
| 2007/0110285 | A1 | * | 5/2007  | Hanna et al. ................. 382/117 |
| 2007/0253604 | A1 | * | 11/2007 | Inoue et al. ................... 382/118 |

OTHER PUBLICATIONS

Jee, et al. "Liveness Detection for Embedded Face Recognition System." International Journal of Biomedical Sciences. (2006): 29-32. Print.*
Lee, et al. "Measurement of Ocular Torsion Using Iterative Lucas-Kanade Optical Flow Method." Proceedings of the IEEE Engineering in Medicine and Biology 27th Annual Conference. (2005): 6433-6436. Print.*
Kollreider, et al. "Evaluating Liveness by Face Images and the Structure Tensor." Proceedings of the Fourth IEEE Workshop on Automatic Identification Advanced Technologies . (2005): 1-6. Print.*
Chetty, et al. "Audio-Visual Multimodal Fusion for Biometric Person Authentication and Liveness Verification." Audio-Visual Multimodal Fusion for Biometric Person Authentication and Liveness Verification. In Proc. NICTA-HCSNet Multimodal User Interaction Workshop, MMUI 2005. 57. (2006): 17-24. Print.*

(Continued)

*Primary Examiner* — Michael A Newman
(74) *Attorney, Agent, or Firm* — Staas & Halsey LLP

(57) ABSTRACT

Object feature points are tracked in a video image, and detected feature points are affine-transformed. Then, it is determined whether the video image is a real object using characteristics of the affine-transformed feature points. Therefore, liveness detection resistant to spoofing can be performed without requiring user intervention and additional hardware.

20 Claims, 7 Drawing Sheets

OTHER PUBLICATIONS

Frischholz, et al. "Avoiding Replay-Attacks in a Face Recognition System using Head-Pose Estimation." Proceedings of the IEEE International Workshop on Analysis and Modeling of Faces and Gestures. (2003): 1-2. Print.*

Chetty, et al. "Liveness Verification in Audio-Video Speaker Authentication." Proceedings of the 10th Australian International Conference on Speech Science & Technology. (2004): 358-363. Print.*

Bettinger, et al. "A Model of Facial Behaviour." Proceedings of the Sixth IEEE International Conference on Automatic Face and Gesture Recognition. (2004): 1-6. Print.*

Jee et al. "Liveness Detection for Embedded Face Recognition System." International Journal of Biomedical Sciences. (2006): 29-32. Print.*

Lee et al. "Measurement of Ocular Torsion Using Iterative Lucas-Kanade Optical Flow Method." Proceedings of the IEEE Engineering in Medicine and Biology 27th Annual Conference. (2005): 6433-6436. Print.*

Wang, et al. "Improving Face Recognition by Online Image Alignment." ICPR '06 Proceedings of the 18th International Conference on Pattern Recognition. 1. (2006): 1-4. Print.*

"Pyramidal Implementation of the Lucas Kanade Feature Tracker Description of the algorithm," J.Y. Bouguet, OpenCV Documentation, Microprocessor Research Labs, Intel Corp., 2000.

"Good Features to Track," Jianbo Shi et al., Proc. IEEE Comput.Soc. Conf. Comput. Vision and Pattern Recogn., p. 593-600, 1994.

"Real Time Tracking of Non-Rigid Objects using Mean Shift," D. Comaniciu et al., CVPR 2000.

"Robust Real-time Object Detection," Paul Viola et al., Second International Workshop on Statistical and Computations Theories of Vision—Modeling, Learning, Computing, and Sampling, Vancouver, Canada, Jul. 2001.

* cited by examiner

US 8,355,530 B2

LIVENESS DETECTION METHOD AND APPARATUS OF VIDEO IMAGE

BACKGROUND OF THE INVENTION

This application claims the priority of Korean Patent Application No. 10-2007-0015530, filed on Feb. 14, 2007, in the Korean Intellectual Property Office, the disclosure of which is incorporated herein in its entirety by reference.

1. Field of the Invention

The present invention relates to a liveness detection method and apparatus, and more particularly, to a liveness detection method and apparatus which detect a real object by distinguishing a two-dimensional (2D) flat object from a three-dimensional (3D) non-flat object in a video image.

2. Description of the Related Art

Recently, many studies on biometrics have been conducted. Biometrics is widely applied to biometric authentication systems using face or iris recognition, mobile phone security, mobile commerce, physical/logical access control, e-commerce, and the like. However, no attention is paid to liveness detection.

Biometric authentication systems are vulnerable to forgery since fingerprints, irises, and faces can be easily forged. Hence, overcoming vulnerability to forgery is becoming an important issue for biometric system security. The kind of forgery described above is called 'spoofing,' which is carried out using a series of processes to intrude into a biometric authentication system using fake biometric samples.

Liveness detection apparatus resistant to spoofing is essential to tackle such spoofing. In particular, it is required to implement liveness detection technology using a non-intrusive method and without additional hardware.

Conventional real face detection methods are classified into a method using movements and three-dimensional (3D) technology, a user interaction method, and a method using additional hardware.

The method using movements and 3D uses a structure from motion method (SFM) in order to estimate the 3D-depth of a tracked object. This depth information is used to distinguish a real facial image from a photographed image.

The user interaction method tracks facial features and interprets a feature trajectory or a change in form. However, this method is inaccurate since the trajectory of a real facial characteristic image is similar to that of a photographed image. In addition, user manipulation is required to track features of a face, thereby causing inconvenience.

The invention disclosed in U.S. Patent No. 2005/0129286 relates to determining whether a real face has been made by examining the state of the eyes and changes of eye position. However, since conventional imaging hardware takes a photograph of an image 25 or 30 frames per second, it cannot not easily detect eye blinks. Therefore, users have to carefully change focus to meet system requirements.

The inventions disclosed in U.S. Patent Nos. 2002/0183624 and 2005/0134427 are related to the method of using additional hardware. Specifically, the invention disclosed in U.S. Patent No. 2002/0183624 uses an active-type light-emitting device in order to distinguish real samples from fake ones. While this invention is a robust algorithm and does not require user manipulation, it requires special light-emitting hardware that limits its application range. Similarly, the invention disclosed in U.S. Patent No. 2005/0134427 also requires special hardware to measure body temperature.

SUMMARY OF THE INVENTION

The present invention provides a liveness detection method and apparatus which can perform strong liveness estimation by distinguishing a two-dimensional (2D) flat object from a three-dimensional (3D) non-flat object using video sequence images and without requiring additional hardware or user manipulation.

According to an aspect of the present invention, there is provided a liveness detection method including detecting an object feature point from a predetermined frame of a video image and initializing a tracking operation; tracking object feature points of subsequent frames of the video image based on the detected object feature point; affine-transforming the detected object feature point and the tracked object feature point of an (n−1)-th frame for an n-th frame and calculating statistical distances between the affine-transformed object feature points and the tracked object feature point of the n-th frame; and calculating a liveness value based on the calculated statistical distances and determining whether the video image is a real object based on the calculated liveness value.

According to another aspect of the present invention, there is provide a liveness detection method including detecting an object feature point from a video image and initializing a tracking operation; tracking object feature points of frames subsequent to a frame from which the object feature point was detected; and affine-transforming the detected object feature point and the tracked object feature point of an (n−1)-th frame for an n-th frame and determining whether the video image is a real object using characteristics of the affine-transformed object feature points and the tracked feature point of the n-th frame.

According to another aspect of the present invention, there is provided a liveness detection apparatus including an initialization unit detecting an object feature point from a predetermined frame of a video image and initializing a tracking operation; a tracking unit tracking object feature points of subsequent frames of the video image based on the detected object feature point; a calculation unit affine-transforming the detected object feature point and the tracked object feature point of an (n−1)-th frame for an n-th frame and calculating statistical distances between the affine-transformed object feature points and the tracked object feature point of the n-th frame; and a detection unit calculating a liveness value based on the calculated statistical distances and determining whether the video image is a real object based on the calculated liveness value.

According to another aspect of the present invention, there is provided a recording medium on which a program for executing the method in a computer is recorded.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown. The invention may, however, be embodied in many different forms and should not be construed as being limited to the embodiments set forth therein; rather, these embodiments are provided so that this disclosure will be thorough and complete, and will fully convey the concept of the invention to those skilled in the art.

Figure 1:
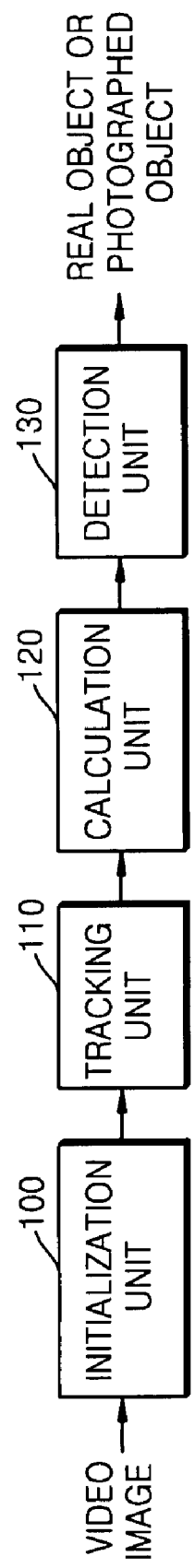
FIG. 1 is a schematic block diagram of a liveness detection apparatus according to an embodiment of the present invention.

FIG. 1 is a schematic block diagram of a liveness detection apparatus according to an embodiment of the present invention.

Referring to FIG. 1, the liveness detection apparatus includes an initialisation unit 100, a tracking unit 110, a calculation unit 120, and a detection unit 130.

The initialisation unit 100 detects an object feature point from a specified frame of an input video image and initialises tracking. In this case, an object and the object feature point may be detected in a first frame or its subsequent frame. This detection process is repeated until the object and its feature point are detected in the video image.

If the object and its feature point are detected in the first frame or its subsequent frame by the initialisation unit 100, the tracking unit 110 tracks an object feature point of each subsequent frame based on the detected object feature point using a predetermined tracking algorithm such as an algorithm based on an optical flow which is calculated using a Lucas-Kanade-Tomasi (LKT) algorithm or a mean-shift algorithm. A detailed description of the tracking algorithm can be found in "Pyramidal Implementation of the Lucas Kanade Feature Tracker," J. Y. Bouguet, OpenCV Documentation, Microprocessor Research Labs, Intel Corp., 2000 and "Real-Time Tracking of Non-Rigid Objects Using Mean Shift," D. Comaniciu, CVPR 2000.

The calculation unit 120 performs affine transformation of each object feature point detected in the first frame or its subsequent frame, and an object feature point of an $(n-1)^{th}$ frame, which is tracked based on the feature point detected in the first frame or its subsequent frame, to an $n^{th}$ frame, i.e., a current frame.

The calculation unit 120 calculates a distance $D^1$ between the affine-transformed object feature point, which is detected in an initial frame, i.e., the first frame or its subsequent frame, and calculates a variance $V^1$ of the distance $D^1$. In addition, the calculation unit 120 calculates a distance $D^2$ between the affine-transformed object feature point of the $(n-1)^{th}$ frame, which is a previous frame of the current frame $n^{th}$ frame and an object feature point of the $n^{th}$ frame, i.e., the current frame. The affine transformation and statistical distances $D^1$ and $D^2$ and $V^1$ will be described in detail later with reference to FIG. 3.

The detection unit 130 calculates liveness values using values of the calculated distances $D^1$ and $D^2$ and variance $V^1$ and determines whether the input video image is a real object or a photographed object based on the calculated liveness values.

Figure 2:
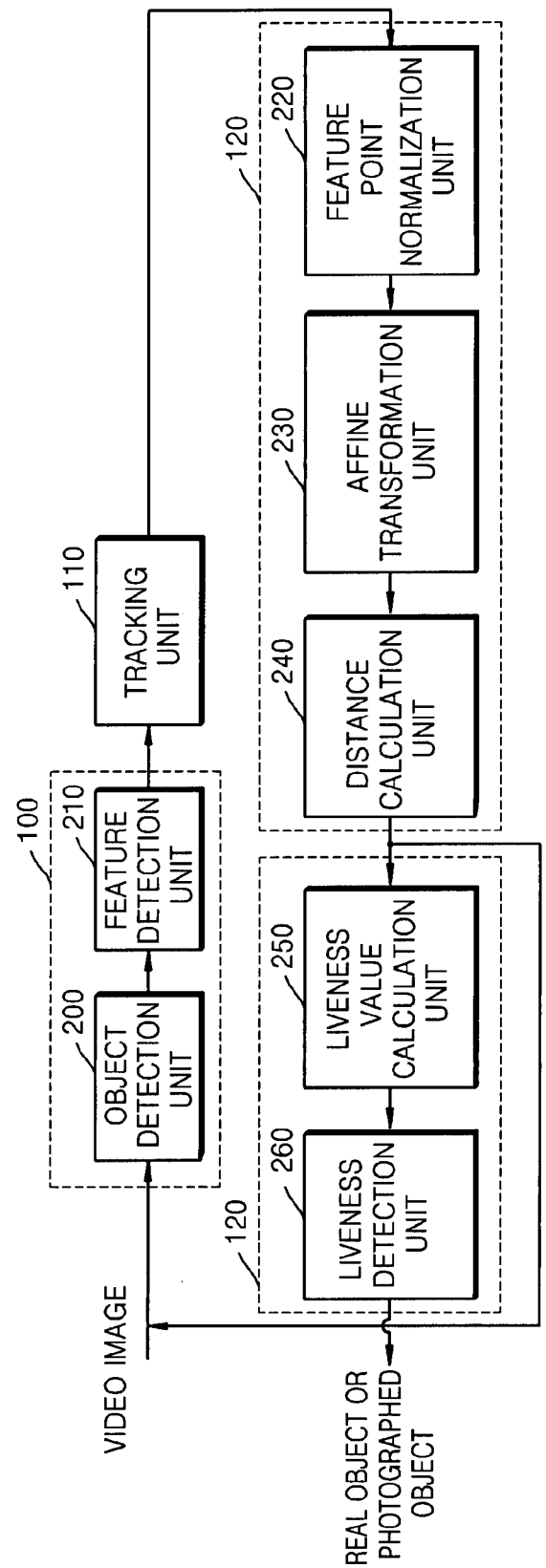
FIG. 2 is a detailed block diagram of the liveness detection apparatus illustrated in FIG. 1.

FIG. 2 is a detailed block diagram of the liveness detection apparatus illustrated in FIG. 1.

Referring to FIG. 2, the liveness detection apparatus includes the initialisation unit 100, which includes an object detection unit 200 and a feature detection unit 210; the tracking unit 110; the calculation unit 120, which includes a feature point normalization unit 220, an affine transformation unit 230 and a distance calculation unit 240; and the detection unit 120 which includes a liveness value calculation unit 250 and a liveness detection unit 260.

The object detection unit 200 detects an object from a specified frame of an input video image. In an embodiment of the present invention, an object includes a face, and an ada-boosting algorithm suggested by J. Vola is used for face detection. A detailed description of face detection is disclosed in "Robust Real-Time Object Detection," Paula Viola, vol. 57, p. 137-154, no. 2, 2004.

The feature detection unit 210 detects feature points in the object detected by the object detection unit 200. In the present embodiment, the object detection unit 200 detects object feature points in an $(n-1)^{th}$ frame of the input video image. In particular, the object detection unit 200 detects a facial image in an image of a first frame and selects facial feature points, which reflect major features of a face, in the detected facial image. In this case, the object is a person's face. Examples of the detected feature points include two points respectively corresponding to central positions of the eyes, a point corresponding to the position of a nose tip, two points respectively corresponding to both ends of the lips, and a point corresponding to the uppermost point of the upper lip.

Methods of detecting object feature points include an active appearance model (MM) and an active shape model (ASM). The ASM detects the position of the eyes and determines the positions of feature points using shape information of parts other than the eyes, such as the nose, lips and eyebrows, according to a generic model based on the detected position of the eyes. The MM detects feature points, which can efficiently describe facial features, by taking into consideration texture information in addition to shape information.

In the present embodiment, corners may be detected in order to select better feature points. That is, corners of a detected facial region are detected and feature points are selected accordingly in order to reduce errors which may occur during the detection of feature points.

Corner detection is performed using Equations (1) and (2) below. That is, a matrix G and an eigen value $\lambda_m$ of the matrix G are calculated for each pixel of an image I.

$$G = \sum_{x=p_x-w_x}^{p_x+w_x} \sum_{y=p_y-w_y}^{p_y-w_y} \begin{bmatrix} I_x^2(x,y) & I_x(x,y)I_y(x,y) \\ I_x(x,y)I_y(x,y) & I_y^2(x,y) \end{bmatrix}, \quad (1)$$

$$I_x = \frac{I(x+1,y)-I(x-1,y)}{2} \quad I_y = \frac{I(x,y+1)-I(x,y-1)}{2}, \quad (2)$$

where I(x, y) indicates a grey image, and $(w_x, w_y)$ indicates the width and height of an image region.

The matrix G and the unique value $\lambda_m$ of the matrix G are calculated, and feature points are selected. The maximum eigen value among the eigen values $\lambda_m$ for each pixel of the image is $\lambda_{max}$, and pixels satisfying $\lambda_m > 0.2\lambda_{max}$ are searched for a maximum pixel. In this case, the eigen values $\lambda_m$ of the selected pixels are greater than those of other pixels. In addition, the distance between the selected pixels is maintained to be less than a predetermined value.

A detailed description of corner detection is disclosed in "Good Features to Track," Jianbo Shi, Proc. IEEE Comput. Soc. Conf. Comput. Vision and Pattern Recogn., p. 593-600, 1994.

The tracking unit 110 tracks feature points of subsequent frames based on the feature points of the object detected by the feature detection unit 210.

In an embodiment of the present invention, if facial feature points are detected in the first frame by the initialisation unit 100, the tracking unit 110 calculates an optical flow which minimizes the difference between pixel values of the first frame and a second frame. For example, the tracking unit 110 may obtain a grey level of a template image of a predetermined size based on each of the facial feature points detected in the first frame and a grey level of a template image of the second frame, which corresponds to the template image of the first frame and calculate the optical flow using the difference between respective grey levels of pixels included in the template images. In the present embodiment, the optical flow is calculated using an LKT algorithm. A value of an optical flow v, which minimizes a value of $\epsilon(v)$, can be calculated using Equations (3) through (7) below.

$$\varepsilon(v) = \varepsilon(v_x, v_y) = \sum_{x=u_x-\omega_x}^{u_x+\omega_x} \sum_{y=u_y-\omega_y}^{u_y+\omega_y} (I(x, y) - J(x + v_x, y + v_y))^2, \quad (3)$$

$$I_x(x, y) = \frac{I(x+1, y) - I(x-1, y)}{2}, \quad I_y(x, y) = \frac{I(x, y+1) - I(x, y-1)}{2}, \quad (4)$$

$$G(u_x, u_y) = \sum_{x=u_x-\omega_x}^{u_x+\omega_x} \sum_{y=u_y-\omega_y}^{u_y+\omega_y} \begin{bmatrix} I_x^2 & I_x I_y \\ I_x I_y & I_y^2 \end{bmatrix}, \quad (5)$$

$$\delta I(x, y) = I(x, y) - J(x, y),$$

$$\bar{b} = \sum_{x=u_x-\omega_x}^{u_x+\omega_x} \sum_{y=u_y-\omega_y}^{u_y+\omega_y} \begin{bmatrix} \delta I I_x \\ \delta I I_y \end{bmatrix}, \quad (6)$$

$$v = G^{-1} \bar{b}, \quad (7)$$

where I indicates a previous $((n-1)^{th})$ frame, J indicates a current $(n^{th})$ frame, $u=(u_x, u_y)$ indicates a feature point of the previous frame, $v=(v_x, v_y)$ indicates an optical flow, $(w_x, w_y)$ indicates a template size of an image for calculating the optical flow, and $I_x$ and $I_y$ indicate differential image values of I.

The feature point normalization unit 220 normalizes the feature points detected by the feature point detection unit 210, that is, the feature points of the initial frame, the feature frames of the current frame ($n^{th}$ frame), and the feature frames of the previous frame $((n-1)^{th}$ frame).

The detected feature points are normalized using Equation (8).

$$P_i(n) = \frac{P_i(n) - \bar{P}(n)}{\sigma_{P(n)}} \quad (8)$$

$$\begin{cases} \bar{P}(n) = \frac{1}{N} \sum_{i=1}^{N} P_i(n) \\ \sigma_{P(n)} = \sqrt{\left( \frac{1}{N} \sum_{i=1}^{N} P_i(n) \cdot P_i(n) - \bar{P}(n) \cdot \bar{P}(n) \right)}, \end{cases}$$

where $P_i(n)$, n=1, 2, ... N.

The affine transformation unit 230 performs an affine transformation on the feature points normalized by the feature point normalization unit 220. In other words, the affine transformation unit 230 performs the affine transformation on the feature points of the initial frame for the current frame ($n^{th}$ frame) and performs the affine transformation on the feature points of the previous frame $((n-1)^{th}$ frame) for the current frame ($n^{th}$ frame).

$$S_x = \frac{1}{n} \sum_{i=1}^{n} x_i \quad S_y = \frac{1}{n} \sum_{i=1}^{n} y_i \quad (9)$$

$$S_{x'} = \frac{1}{n} \sum_{i=1}^{n} x_i' \quad S_{y'} = \frac{1}{n} \sum_{i=1}^{n} y_i'$$

$$S_{xx} = \frac{1}{n} \sum_{i=1}^{n} x_i^2 \quad S_{yy} = \frac{1}{n} \sum_{i=1}^{n} y_i y_i$$

$$S_{xy} = \frac{1}{n} \sum_{i=1}^{n} x_i y_i$$

$$S_{xx'} = \frac{1}{n} \sum_{i=1}^{n} x_i x_i' \quad S_{yy'} = \frac{1}{n} \sum_{i=1}^{n} y_i y_i'$$

$$S_{xy'} = \frac{1}{n} \sum_{i=1}^{n} x_i y_i' \quad S_{yx'} = \frac{1}{n} \sum_{i=1}^{n} y_i x_i',$$

where $(x_i, y_i)$ indicates coordinates of feature points determined in the previous frame $((n-1)^{th}$ frame), and $(x_i', y_i')$ indicates coordinates of feature points determined in the current frame ($n^{th}$ frame).

$$T\begin{pmatrix} x \\ y \end{pmatrix} = \begin{pmatrix} a & b \\ c & d \end{pmatrix} \begin{pmatrix} x \\ y \end{pmatrix} + \begin{pmatrix} t_x \\ t_y \end{pmatrix}, \quad (10)$$

$$\begin{pmatrix} a & b \\ c & d \end{pmatrix} = \frac{1}{\Delta} \begin{pmatrix} S_{xx'} & S_{yx'} \\ S_{xy'} & S_{yy'} \end{pmatrix} \begin{pmatrix} S_{yy} & -S_{xy} \\ -S_{xy} & S_{xx} \end{pmatrix}$$

$$\Delta = S_{xx} S_{yy} - S_{xy}^2$$

$$t_x = S_{x'} \quad t_y = S_{y'}. \quad (11)$$

An affine transformation parameter T is determined by six elements ($t_x$, $t_y$, a, b, c and d) as shown in Equation (10).

The biggest difference between a photographed facial image and a real facial image is that the photographed facial image is a 2D flat object without depth changes while the real facial image is a 3D object having relatively large depth changes.

In an ideal imaging condition, ideal orthography, which is a condition without image noise and distortion, and an ideal tracking algorithm without tracking errors and bias, the distance between affine-transformed tracking points different frames is a flat object, that is, zero for a photographed face. On the other hand, this distance is greater for a real facial object than a photographed facial object.

However, the distance in a photographed face is definitely not zero. Therefore, stronger liveness detection must be defined to exclude external factors, such as tracking effects and imaging conditions, and to reflect internal factors such as the difference in 3D depths of a photographed face and a real face.

The affine transformation will now be described with reference to FIG. 3. First of all, it is assumed that a feature point i of a first frame is $P_i(1)$, where i=1, 2, N (N>3).

Figure 3:
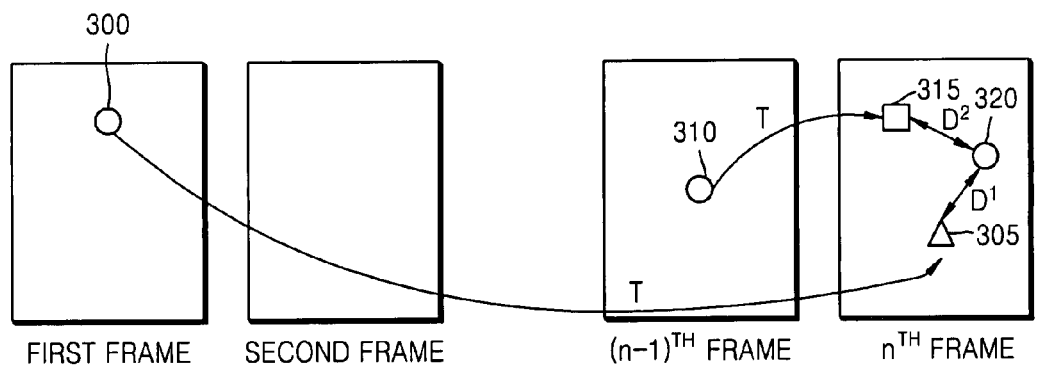
FIG. 3 is a diagram for illustrating the concept of statistical distances ($D^1$ and $D^2$) according to another embodiment of the present invention.

First through $n^{th}$ frames are illustrated in FIG. 3. In addition, the feature point $P_i(1)$ (300) of the first frame, a feature point $P_i(n-1)$ (310) of the $(n-1)^{th}$ frame, and a feature point $P_i(n)$ (320) of the $n^{th}$ frame are illustrated.

For N>3, the feature point $P_i(1)$ (300) of the first frame is affine-transformed for a current frame (the $n^{th}$ frame). The affine-transformed feature point of the first frame is indicated by $\tilde{P}_i(1)$ (305).

The feature point $P_i(n-1)$ (310) of a previous frame (the $(n-1)^{th}$ frame) is affine-transformed for the current frame (the $n^{th}$ frame). The affine-transformed feature point of the $(n-1)^{th}$ frame is indicated by $\tilde{P}_i(n-1)$ (315).

Referring back to FIG. 2, the distance calculation unit 240 calculates a distance $D_i^1(n)$ between the affine-transformed feature point $\tilde{P}_i(1)$ (305) of the first frame and the feature point $P_i(n)$ of the current frame using Equation (12) below.

$$D_i^1(n) = \|P_i(n) - \tilde{P}_i(1)\|. \quad (12)$$

$D^1(n)$ is given by Equation (13).

$$D^1(n) = \frac{1}{K} \sum_{i=1}^{K} D_i^1(n), \quad (13)$$

where $D^1(n)$ is an average of $D_i^1(n)$, and K is the number of feature points.

$D_1$ is zero for flat objects. A real value of $D^1(n)$ is mainly related to an accumulated tracking error. The real value of $D^1(n)$ increases when a tracked point is located a large distance from its initial position.

In addition, the distance calculation unit 240 calculates a distance $D_i^2(n)$ between the affine-transformed feature point $\tilde{P}_i(n-1)$ (315) of the $(n-1)^{th}$ frame and the feature point $P_i(n)$ of the current frame using Equation (14) below.

$$D_i^2(n) = \|P_i(n) - \tilde{P}_i(n-1)\|. \quad (14)$$

$D^2(n)$ is given by Equation (15).

$$D^2(n) = \frac{1}{K} \sum_{i=1}^{K} D_i^2(n), \quad (15)$$

where $D^2(n)$ is an average of $D_i^2(n)$, and K is the number of feature points.

According to the definition of $D^2(n)$, a value of $D^2(n)$ is the distance between feature points of two successive frames. The value of $D^2(n)$ is mainly related to motion information.

If an object moves faster, factors, such as motion blur and the exceeding of a search range of the tracking algorithm, are generated. These factors increase the possibility of tracking errors or tracking bias. Therefore, the value of $D^2(n)$ increases in such cases.

If the value of $D^2(n)$ is greater than a predetermined threshold value $T_1$, that is, $D^2 > T_1$, a serious tracking error exists. Therefore, a system is automatically restarted in order to prevent a tracking error caused by dramatic motions.

The difference between $D^1(n)$ and $D^2(n)$ is that $D^1(n)$ indicates an error caused by the accumulated tracking result and $D^2(n)$ indicates an instantaneous tracking error.

In addition, a variance of $D^1$ is given by Equation (16) below.

$$V^1(n) = \frac{1}{K} \sum_{i=1}^{K} D_i^1(n) \cdot D_i^1(n) - \overline{D}^1(n) \cdot \overline{D}^1(n), \quad (16)$$

where $V^1(n)$ indicates a variance of $D_i^1(n)$, K indicates the number of feature points, and indicates an average of $D_i^1(n)$.

Since $V^1(n)$ is the variance of $D^1(n)$, ever-present external factors, such as image distortion and quantization and average tracking effects, can be reduced.

If an input object is a flat object, $V^1(n)$ will have a small value. On the other hand, if the input object is a 3D object, $V^1(n)$ will have a greater value than that of the flat object.

The liveness value calculation unit 250 calculates a liveness value using values of $D^1$, $D^2$ and $V^1$ calculated by the distance calculation unit 240 and using Equation (17).

$$L(n) = \frac{V^1(n)}{D^1(n) \cdot D^2(n)}. \quad (17)$$

In other words, the liveness value L(n) is obtained by dividing $V^1(n)$ by $D^1(n)$ and $D^2(n)$.

The liveness value may also be calculated using Equation (18) in order to increase the robustness of the liveness value. That is, L(n) given by Equation (17) is divided by frames F.

$$L = \frac{1}{F} \sum_{i=n}^{F} L(n). \quad (18)$$

If the liveness value L given by Equation (18) is greater than a predetermined threshold value $T_2$, that is, $L > T_2$, the liveness detection unit 260 determines that the input video image is a real object. If the liveness value L is less than the predetermined threshold value $T_2$, that is, $L < T_2$, the liveness detection unit 260 determines that the input video image is a photographed object. The threshold value $T_2$ can be determined by a user or system characteristics.

In summary, the biggest difference between images of a photographed face and a real face is that the photographed face is a flat object while the real face is a 3D object with relatively large depth changes. This difference is used to define three statistical distances $D^1$, $D^2$ and $V^1$.

$D^1$ indicates an accumulated tracking error. The value of $D^1$ increases when feature points deviate from their initial forms. $D^2$ is mainly related to motion information. As feature points move faster, the value of $D^2$ is increased.

$V^1$ includes 3D depth changes. If tracked feature points are on the same plane or hardly show depth changes, the value of $V^1$ is very small. If not, the value of $V^1$ is large.

As described above, the liveness value L defined in the present embodiment is obtained by dividing $V^1$ by $D^1$ and $D^2$. The liveness value L reflects 3D information of a tracked object which is compensated for an accumulated tracking error and a motion tracking error.

Figure 4:
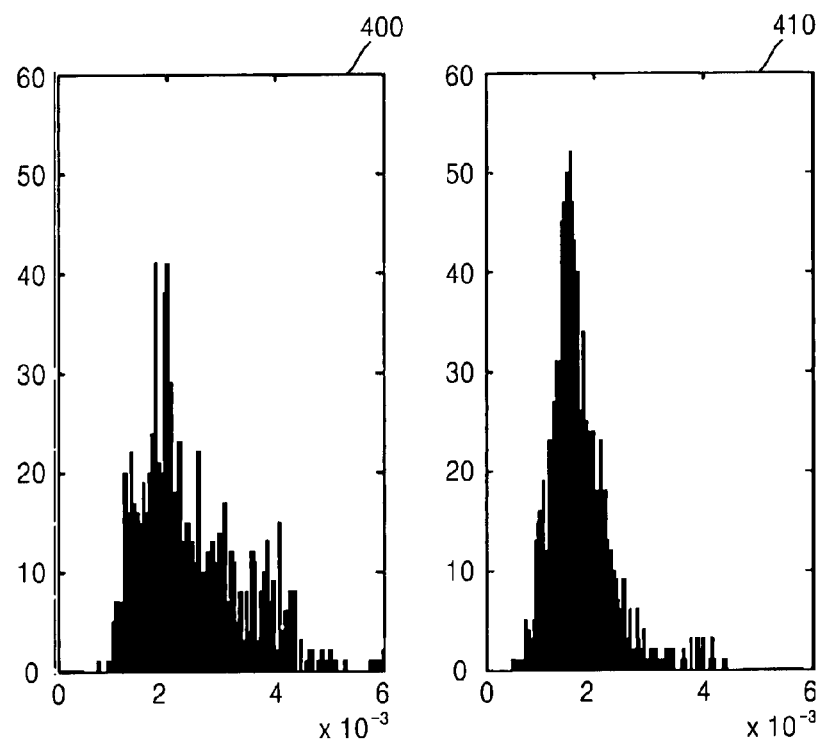
FIGS. 4 through 6 compare statistical distances $D^1$, $D^2$ and $V^1$ of a real object with those of a photographed object according to another embodiment of the present invention.
Figure 5:
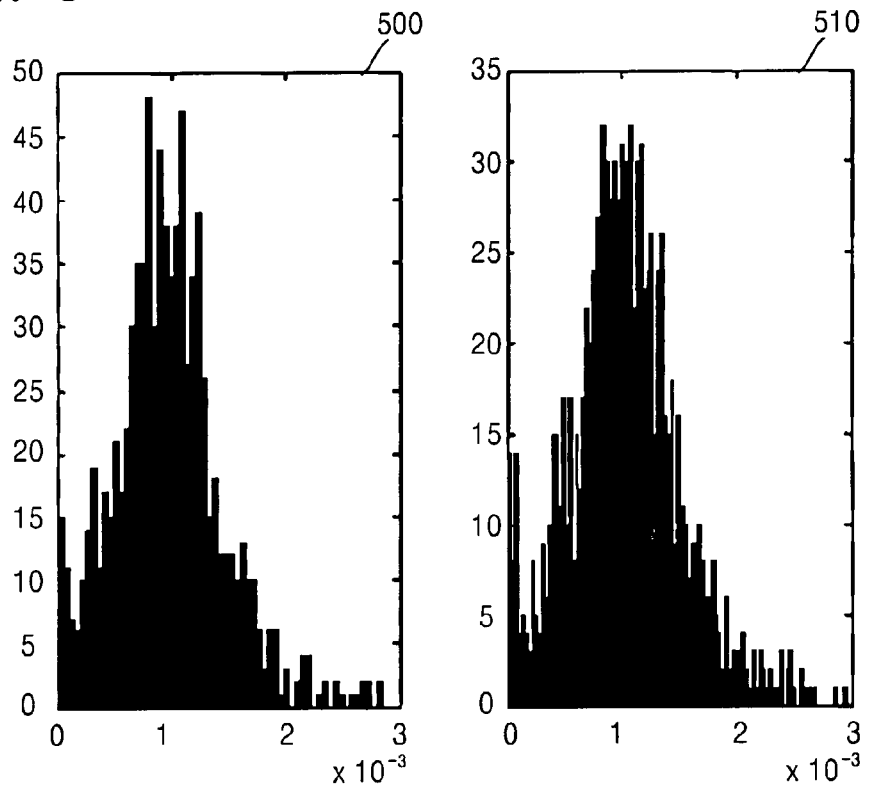
Figure 6:
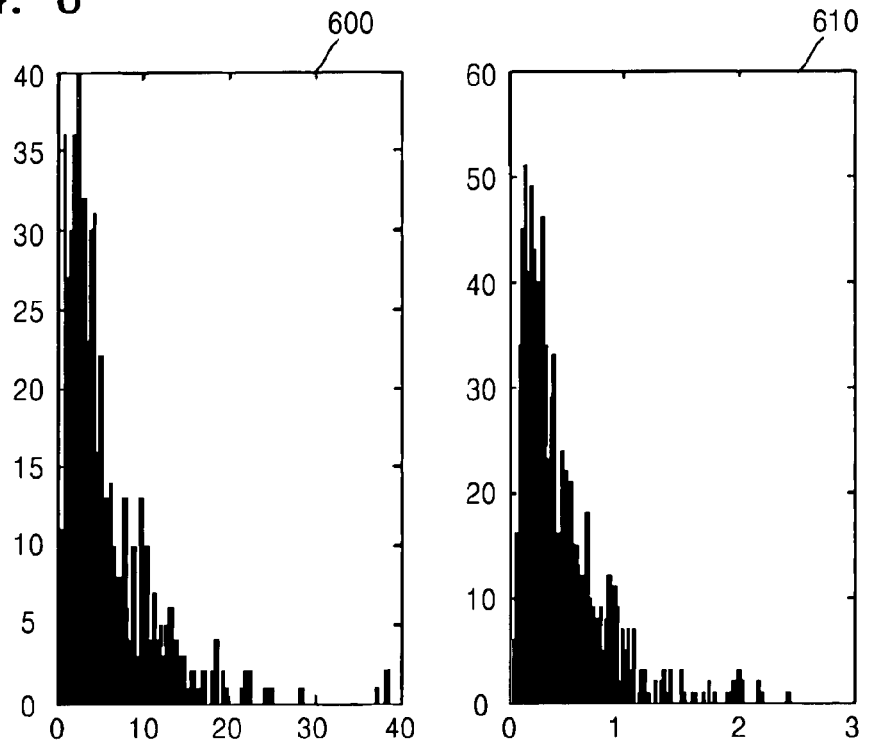

FIGS. 4 through 6 compare statistical distances $D^1$, $D^2$ and $V^1$ of a real object with those of a photographed object according to another embodiment of the present invention.

FIGS. 4 through 6 illustrate histograms of the statistical distances $D^1$, $D^2$ and $V^1$ of a real face and a photographed face.

The X axis indicates values of $D^1$, $D^2$ and $V^1$, which are quantized into 256 levels, within a predetermined range, i.e., between a minimum value and a maximum value. The Y axis indicates the number of frames.

The values of $D^1$ and $D^2$ when a video image is a real face 400 or 500 and when it is a photographed face 410 or 510 are similar under general tracking conditions.

However, while the value of $V^1$ is large when the video image is a real face 600, it is smaller when the video image is a photographed face 610.

Figure 7:
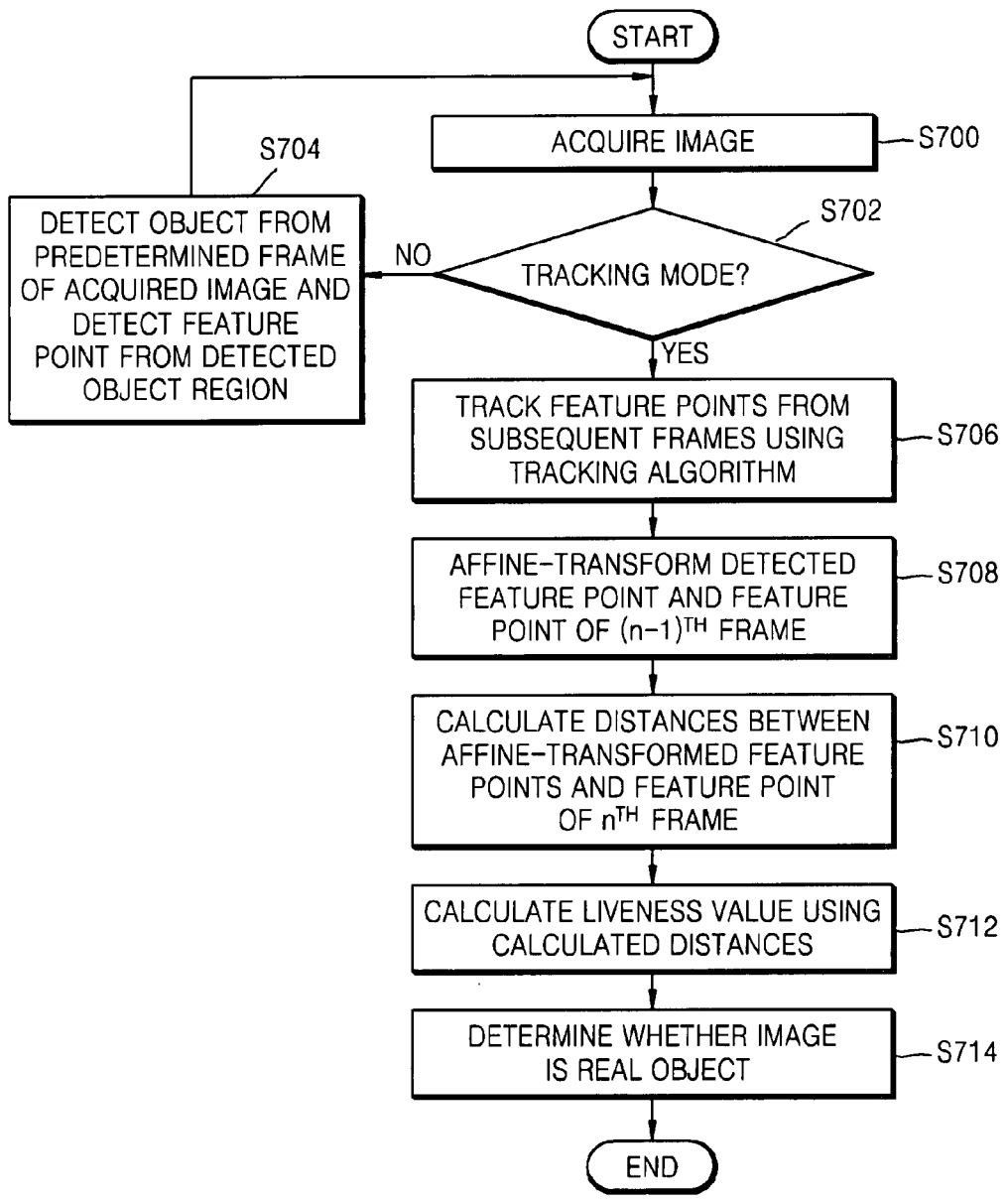
FIG. 7 is a flowchart illustrating a liveness detection method according to another embodiment of the present invention.

FIG. 7 is a flowchart illustrating a liveness detection method according to another embodiment of the present invention.

Referring to FIG. 7, the liveness detection apparatus obtains a video image and determines whether a current system is in a tracking mode in operations S700 and S702. The tracking mode is performed after an object and its feature point are detected in the video image.

If the current system is not in the tracking mode, the liveness detection apparatus detects an object and its feature point from a next frame in operation S704. After detecting the object and its feature point are performed, the liveness detection apparatus tracks feature points of subsequent frames in operation S706.

In operation S708, the detected feature point and a feature point of an $(n-1)^{th}$ frame are affine-transformed for an $n^{th}$ frame. In operation S710, the distance $D^1$ between the initially detected and affine-transformed feature point and a feature point of the $n^{th}$ frame is calculated, and the distance $D^2$ between the affine-transformed feature point of the $(n-1)^{th}$ frame and the feature point of the $n^{th}$ frame, i.e., a current frame, is calculated. In addition, the variance $V^1$ of the distance $D^1$ between the initially detected and affine-transformed feature point and the feature point of the $n^{th}$ frame is calculated.

In operation S712, a liveness value L is calculated based on the statistical distance values $D^1$, $D^2$ and $V^1$, which were calculated in operation S710, and using Equation (18) above.

In operation S714, it is determined whether the video image is a real object using the liveness value L calculated in operation S712.

Figure 8:
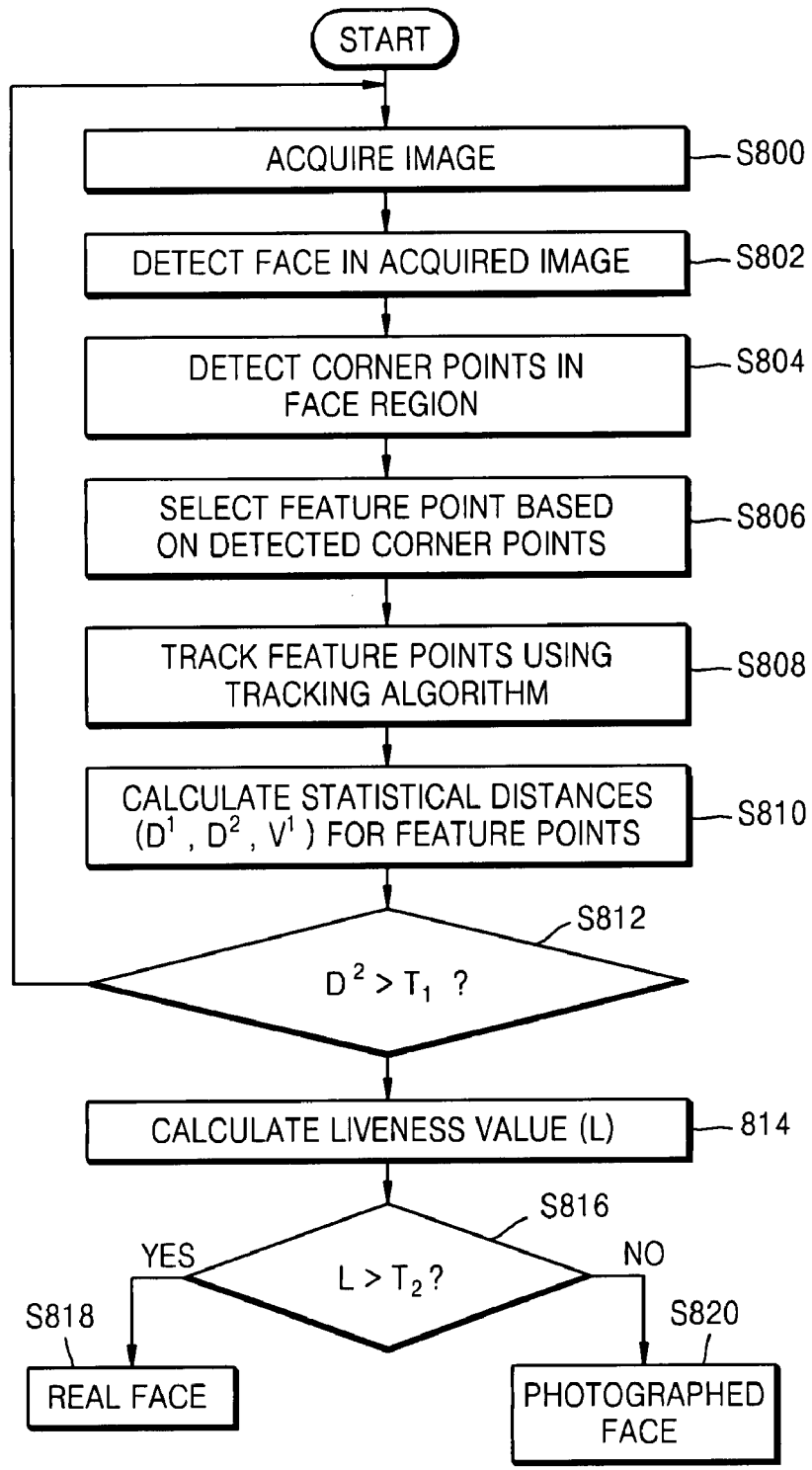
FIG. 8 is a flowchart illustrating a liveness detection method according to another embodiment of the present invention.

FIG. 8 is a flowchart illustrating a liveness detection method according to another embodiment of the present invention.

Referring to FIG. 8, an image frame is acquired from an input video image, and a face is detected in the acquired image frame in operations S800 and 802. In operation S804, corner points are detected in the detected face region. In operation S806, feature points are selected based on the detected corner points. In operation S808, feature points of subsequent frames are tracked using a tracking algorithm, e.g., the LKT algorithm. In operation S810, statistical distances $D^1$, $D^2$ and $V^1$ for the detected feature points and the tracked feature points are calculated. In operation S812, it is determined whether $D^2$ is greater than a predetermined threshold value $T_1$. This operation is performed to restart a system when an excessive tracking error occurs. In other words, if $D^2 > T_1$, a video image is acquired again back in operation S800, and subsequent operations are also performed again.

If $D^2 < T_1$, a liveness value L is calculated using Equation (18) in operation S814. In operation S816, it is determined whether the liveness value L is greater than a predetermined threshold value $T_2$. If $L > T_2$, it is determined that the input video image is a real face. If $L < T_2$, it is determined that the input video image is a photographed face.

Figure 9:
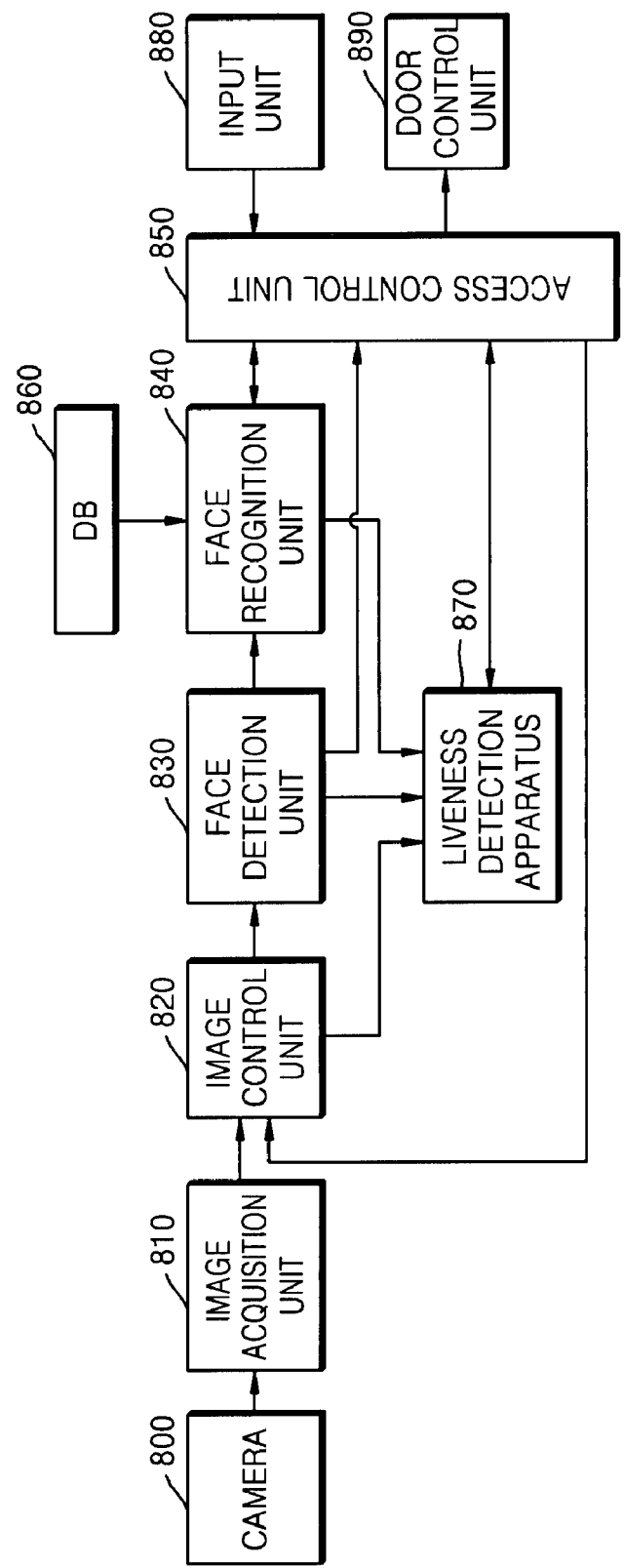
FIG. 9 is a schematic block diagram of an access control system using a liveness detection apparatus, according to another embodiment of the present invention.

FIG. 9 is a schematic block diagram of an access control system using a liveness detection apparatus 870, according to another embodiment of the present invention.

Referring to FIG. 9, the access control system includes a camera 800, an image acquisition unit 810, an image control unit 820, a face detection unit 830, a face recognition unit 840, an access control unit 850, a database (DB) 860, the liveness detection apparatus 870, an input unit 880, and a door control unit 890.

The access control system detects a video image, e.g., a person's face, photographed by the camera 800, recognizes the detected face, and opens the door. In this case, the access control system can determine whether the photographed video image is a real face or a photographed face of the person using the liveness detection apparatus 870 according to the present invention.

The present invention can also be implemented as computer-readable code on a computer-readable recording medium. The computer-readable recording medium is any data storage device that can store data which can be thereafter read by a computer system. Examples of the computer-readable recording medium include read-only memory (ROM), random-access memory (RAM), CD-ROMs, magnetic tapes, floppy disks, optical data storage devices, and carrier waves (such as data transmission through the Internet).

The computer-readable recording medium can also be distributed over network-coupled computer systems so that the computer-readable code is stored and executed in a distributed fashion. Also, functional programs, code, and code segments for accomplishing the present invention can be easily construed by programmers skilled in the art to which the present invention pertains.

According to the present invention, object feature points are tracked from a video image, and detected feature points are affine-transformed. Then, it is determined whether the video image is a real object using characteristics of the affine-transformed feature points. Therefore, liveness detection resistant to spoofing can be performed without requiring user intervention and additional hardware.

While the present invention has been particularly shown and described with reference to exemplary embodiments thereof, it will be understood by those of ordinary skill in the art that various changes in form and details may be made therein without departing from the spirit and scope of the present invention as defined by the following claims. The exemplary embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A liveness detection method comprising:
   detecting an object feature point from a predetermined frame of a video image and initializing a tracking operation;
   tracking object feature points of subsequent frames of the video image based on the detected object feature point;
   affine-transforming the detected object feature point and the tracked object feature point of an (n−1)-th frame with respect to an n-th frame and calculating statistical distances between the affine-transformed object feature points and the tracked object feature point of the n-th frame; and
   calculating a liveness value L based on the calculated statistical distances and determining whether the video image is a real object based on the calculated liveness value L,
   wherein the liveness value L is calculated by a ratio of a distance $D^1$ between the affine-transformed, detected object feature point and the object feature point of the n-th frame, a distance $D^2$ between the affine-transformed object feature point of the (n−1)-th frame and the object feature point of the n-th frame, and a variance $V^1$ of the distance $D^1$.

2. The method of claim 1, wherein the affine-transforming of the detected object feature point and the tracked object feature point and the calculating of the statistical distances comprises calculating the distance $D^1$ between the affine-transformed, detected object feature point and the object feature point of the n-th frame, the distance $D^2$ between the affine-transformed object feature point of the (n−1)-th frame and the object feature point of the n-th frame, and a variance $V^1$ of the distance $D^1$.

3. The method of claim 2, wherein the affine-transforming of the detected object feature point and the tracked object feature point and the calculating of the statistical distances comprises:
  normalizing the detected object feature point, the object feature point of the (n−1)-th frame, and the object feature point of the n-th frame;
  affine-transforming the normalized, detected object feature point and the normalized object feature point of the (n−1)-th frame for the n-th frame; and
  calculating the distance $D^1$ between the affine-transformed, detected object feature point and the object feature point of the n-th frame, the distance $D^2$ between the affine-transformed object feature point of the (n−1)-th frame and the object feature point of the n-th frame, and the variance $V^1$ of the distance $D^1$.

4. The method of claim 3, wherein, in the calculating of the liveness value L and the determining of whether the video image is the real object, the liveness value L is obtained by dividing the variance $V^1$ by the product of distances $D^1$ and $D^2$, as the ratio of the distance $D^1$, distance $D^2$, and variance $V^1$.

5. The method of claim 4, wherein the calculating of the liveness value L and the determining of whether the video image is the real object comprises determining whether the liveness value L is greater than a predetermined threshold value.

6. The method of claim 2, wherein the affine-transforming of the detected object feature point and the tracked object feature point and the calculating of the statistical distances further comprises determining whether the distance $D^2$ between the affine-transformed object feature point of the (n−1)-th frame and the object feature point of the n-th frame is greater than a predetermined threshold value, and the detecting of the object feature point and the initializing of the tracking operation is performed if the distance $D^2$ is greater than the predetermined threshold value.

7. The method of claim 1, wherein the detecting of the object feature point and the initializing of the tracking operation comprises:
  detecting a predetermined object in the predetermined frame of the video image; and
  detecting predetermined corner points in the detected object,
  wherein the object feature point is selected based on the detected corner points.

8. The method of claim 7, wherein the predetermined object is a face.

9. The method of claim 1, wherein the tracking of the object feature points comprises tracking the object feature points using a Lucas-Kanade-Tomasi (LKT) tracking algorithm or a mean shift algorithm.

10. A liveness detection method comprising:
  detecting an object feature point from a video image and initializing a tracking operation;
  tracking object feature points of frames subsequent to a frame from which the object feature point was detected; and
  affine-transforming the detected object feature point and the tracked object feature point of an (n−1)-th frame with respect to an n-th frame and determining whether the video image is a real object using characteristics of the affine-transformed object feature points and the tracked feature point of the n-th frame,
  wherein the liveness value L is calculated by a ratio of a distance $D^1$ between the affine-transformed, detected object feature point and the object feature point of the n-th frame, a distance $D^2$ between the affine-transformed object feature point of the (n−1)-th frame and the object feature point of the n-th frame, and a variance $V^1$ of the distance $D^1$.

11. The method of claim 10, wherein the affine-transforming of the detected object feature point and the tracked object feature point and the determining of whether the video image is the real object comprises calculating the distance $D^1$ between the affine-transformed, detected object feature point and the object feature point of the n-th frame, the distance $D^2$ between the affine-transformed object feature point of the (n−1)-th frame and the object feature point of the n-th frame, and a variance $V^1$ of the distance $D^1$.

12. The method of claim 11, wherein, in the affine-transforming of the detected object feature point and the tracked object feature point and the determining of whether the video image is the real object, if a value obtained by dividing the variance $V^1$ by the product of distances $D^1$ and $D^2$, as the ratio of the distance $D^1$, distance $D^2$, and variance $V^1$, is greater than a predetermined threshold value, the video image is determined to be the real object.

13. The method of claim 10, wherein the tracking of the object feature points comprises tracking the object feature points using an LKT tracking algorithm or a mean shift algorithm.

14. A non-transitory recording medium on which a program for executing the method of any one of claims 1 through 13 in a computer is recorded.

15. A liveness detection apparatus, including at least one processing device, comprising:
  an initialization unit, using the at least one processing device, detecting an object feature point from a predetermined frame of a video image and initializing a tracking operation;
  a tracking unit tracking object feature points of subsequent frames of the video image based on the detected object feature point;
  a calculation unit affine-transforming the detected object feature point and the tracked object feature point of an (n−1)-th frame with respect to an n-th frame and calculating statistical distances between the affine-transformed object feature points and the tracked object feature point of the n-th frame; and
  a detection unit calculating a liveness value L based on the calculated statistical distances and determining whether the video image is a real object based on the calculated liveness value L,
  wherein the liveness value L is calculated by a ratio of a distance $D^1$ between the affine-transformed, detected object feature point and the object feature point of the n-th frame, a distance $D^2$ between the affine-transformed object feature point of the (n−1)-th frame and the object feature point of the n-th frame, and a variance $V^1$ of the distance $D^1$.

16. The apparatus of claim 15, wherein the calculation unit comprises:
- a normalization unit normalizing the detected object feature point, the object feature point of the (n−1)-th frame, and the object feature point of the n-th frame;
- an affine-transformation unit affine-transforming the normalized, detected object feature point and the normalized object feature point of the (n−1)-th frame for the n-th frame; and
- a distance calculation unit calculating the distance $D^1$ between the affine-transformed, detected object feature point and the object feature point of the n-th frame, the distance $D^2$ between the affine-transformed object feature point of the (n−1)-th frame and the object feature point of the n-th frame, and a variance $V^1$ of the distance $D^1$.

17. The apparatus of claim 16, wherein the detection unit comprises:
- a liveness value calculation unit calculating the liveness value L by dividing the variance $V^1$ by the product of the distances $D^1$ and $D^2$, as the ratio of the distance $D^1$, distance $D^2$, and variance $V^1$; and
- a liveness detection unit determining whether the liveness value L is greater than a predetermined threshold value and thus determining whether the video image is the real object.

18. The apparatus of claim 15, wherein the initialization unit comprises:
- an object detection unit detecting a predetermined object in the predetermined frame of the video image; and
- a feature detection unit detecting a predetermined feature point in the detected object.

19. The apparatus of claim 18, wherein the initialization further comprises a corner point detection unit detecting predetermined corner points in the detected object, and the feature detection unit selecting the feature point based on the detected corner points.

20. The apparatus of claim 18, wherein the predetermined object is a face.

* * * * *

UNITED STATES PATENT AND TRADEMARK OFFICE
CERTIFICATE OF CORRECTION

PATENT NO. : 8,355,530 B2  
APPLICATION NO. : 11/889413  
DATED : January 15, 2013  
INVENTOR(S) : Gyu-tae Park et al.

Page 1 of 1

It is certified that error appears in the above-identified patent and that said Letters Patent is hereby corrected as shown below:

In the Claims

Column 12; Line 31; In Claim 12, delete "$D^2$ ," and insert -- $D^2$, --, therefor.
Column 14; Line 1; In Claim 17, delete "$D^1$ ," and insert -- $D^1$, --, therefor.
Column 14; Line 2; In Claim 17, delete "$D^2$ ," and insert -- $D^2$, --, therefor.

Signed and Sealed this
Fourteenth Day of May, 2013

Teresa Stanek Rea
*Acting Director of the United States Patent and Trademark Office*